No. 837,057. PATENTED NOV. 27, 1906.
G. E. HALL.
FISHING FLOAT.
APPLICATION FILED JAN. 19, 1906.

George E. Hall, Inventor

UNITED STATES PATENT OFFICE.

GEORGE E. HALL, OF AKRON, OHIO.

FISHING-FLOAT.

No. 837,057.     Specification of Letters Patent.     Patented Nov. 27, 1906.

Application filed January 19, 1906. Serial No. 296,910.

*To all whom it may concern:*

Be it known that I, GEORGE E. HALL, a citizen of the United States, residing at Akron, in the county of Summit and State of Ohio, have invented new and useful Improvements in Fishing-Floats, of which the following is a specification.

This invention relates to improvements in fishing-floats; and the object is to provide a simple and effective construction of float which may be manufactured and placed upon the market at a comparatively small price, together with the improved method of constructing the same.

With the above object in view the invention consists in the novel features of construction hereinafter fully described, particularly pointed out in the claims, and clearly illustrated by the accompanying drawings, in which—

Figure 1:
Figure 2:
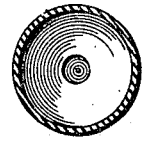

Figure 1 is a longitudinal sectional view of a float constructed in accordance with my invention, and Fig. 2 a transverse sectional view through the bulb portion of the float.

In constructing my improved float it is first built up of hard-rubber compound, after which a small quantity of water is placed therein and the whole put into a mold of the proper form and vulcanized. The effect of the heat in vulcanization is to convert a portion of the water within the float into steam, which inflates or expands said float against the sides of the mold. The water remaining after vulcanization is permitted to remain in the float and serves to assist in maintaining the latter in an upright position when in use.

From the above description it will be seen that I have produced a blown hard-rubber fishing-float which is simple in its construction and which may be manufactured and marketed at a moderate cost.

Having thus fully described my invention, what I claim as new, and desire to secure by Letters Patent of the United States, is—

1. As a new article of manufacture, a hollow hard-rubber fishing-float having a small quantity of fluid contained therein.

2. A fishing-float formed of hard-rubber compound vulcanized, said float being hollow and having a small quantity of liquid contained therein.

3. A fishing-float formed of hard-rubber compound vulcanized and having a bulb portion containing a fluid.

4. A blown fishing-float formed of hard-rubber compound vulcanized and containing water placed therein prior to inflation.

In testimony whereof I affix my signature in presence of two subscribing witnesses.

GEO. E. HALL.

Witnesses:
    W. H. STONER,
    M. H. HARDART